United States Patent
Rinchiuso

(10) Patent No.: US 6,920,119 B2
(45) Date of Patent: Jul. 19, 2005

(54) METHOD FOR SCHEDULING AND ALLOCATING DATA TRANSMISSIONS IN A BROAD-BAND COMMUNICATIONS SYSTEM

(75) Inventor: Joseph Rinchiuso, Elmhurst, IL (US)

(73) Assignee: Motorola, Inc., Schaumburg, IL (US)

( * ) Notice: Subject to any disclaimer, the term of this patent is extended or adjusted under 35 U.S.C. 154(b) by 845 days.

(21) Appl. No.: 09/757,409

(22) Filed: Jan. 9, 2001

(65) Prior Publication Data

US 2002/0090004 A1 Jul. 11, 2002

(51) Int. Cl.[7] .............................. H04Q 7/00; H04J 3/16
(52) U.S. Cl. ...................................... 370/329; 370/437
(58) Field of Search ........................ 370/329, 348–349, 370/437, 462

(56) References Cited

U.S. PATENT DOCUMENTS

| | | | | |
|---|---|---|---|---|
| 5,301,356 A | * | 4/1994 | Bodin et al. ................. | 455/436 |
| 5,666,348 A | * | 9/1997 | Thornberg et al. ........... | 370/230 |
| 5,748,624 A | * | 5/1998 | Kondo ........................ | 370/347 |
| 5,752,193 A | * | 5/1998 | Scholefield et al. ..... | 455/452.2 |
| 5,790,551 A | * | 8/1998 | Chan .......................... | 370/458 |
| 5,862,452 A | * | 1/1999 | Cudak et al. ................. | 725/81 |
| 5,898,681 A | * | 4/1999 | Dutta .......................... | 370/229 |
| 6,058,106 A | * | 5/2000 | Cudak et al. ................ | 370/313 |
| 6,584,089 B1 | * | 6/2003 | Honkasalo et al. .......... | 370/338 |
| 6,721,278 B1 | * | 4/2004 | Rimhagen et al. .......... | 370/252 |

* cited by examiner

Primary Examiner—John Pezzlo
Assistant Examiner—Hong Sol Cho
(74) Attorney, Agent, or Firm—Lalita W. Pace

(57) ABSTRACT

An apparatus and method that schedules and allocates data transmissions over communication channels within a broad-band communications system is provided. Data transmissions are first scheduled with priority to data service users granted access to radio resources first, until more data transmissions require service than there are radio resources available. Then, data transmissions are scheduled according to a resource scheduling priority 135 as determined by a resource scheduling function within a resource scheduling and allocation algorithm 300, 500. The resource scheduling function considers various communications parameters (e.g., frame count, transmission time, number of data frames queued, signal/noise ratio, frame error rate (FER), bit error rate (BER), transmission delay, jitter, etc.) and can be implemented to treat data service requests proportionately (algorithm 300) or disproportionately (algorithm 500). Once assigned, allocation of the radio resource to a given data transmission is based on a resource allocation parameter 140 (e.g., frame count, transmission time).

20 Claims, 10 Drawing Sheets

METHOD FOR SCHEDULING AND ALLOCATING DATA TRANSMISSIONS IN A BROAD-BAND COMMUNICATIONS SYSTEM

FIELD OF THE INVENTION

The present invention relates generally to communications systems and, in particular, to scheduling and allocating data transmissions over communication channels within a broad-band communications system.

BACKGROUND OF THE INVENTION

Communications systems are well known and consist of many types including land mobile radio, cellular radiotelephone, satellite communications, cable television, ordinary telephone, distributed computer networks, and other communications system types. Within a communications system, transmissions are conducted between a transmitting device and a receiving device over a communication resource, commonly referred to as a communication channel.

In today's information age, there is an increasing need for high-speed data communications that provides guaranteed quality of service (QoS) to an ever-increasing number of data service users. To that end, communications networks and technologies are evolving to meet current and future demands. Specifically, networks with wider bandwidths are being deployed to handle the demand for high-speed data and communication protocols are being developed to efficiently utilize the increased bandwidth in order to reach the growing numbers of users demanding data service.

One technology known in the art that is increasingly employed to satisfy these increasing demands is broad-band communications. A broad-band communications system is one in which a single data communication channel (a shared channel) is shared by a number of end users in a coordinated manner so that data transmissions from multiple end users do not interfere with each other. In modern broad-band communications systems, the shared communication channel is typically frequency or time multiplexed over a shared physical medium. The shared physical medium may be coaxial cable, fiber-optic cable, twisted pair wires, and so on, and may also include air, atmosphere, or space for wireless and satellite communications. Since communications networks typically have a limited number of communication channels, the shared channels allow many end users to gain access to the network over a single communication channel, thereby allowing the remaining communication channels to be used for other purposes. Implementation of such a shared channel scheme is most effective when each end user only transmits data intermittently, allowing other end users to transmit during periods of silence.

Broad-band communications systems include third generation (3G) wireless cellular networks that communicate messages to and from mobile devices through a wireless cellular infrastructure. 3G is the next generation of wireless cellular technology with its primary focus on seamlessly evolving earlier wireless cellular systems to provide high-speed data services to support various data and multimedia applications, such as web page browsing. To preserve the existing wireless infrastructure, it is preferable for 3G systems to be compatible with existing voice and low-rate data capabilities of earlier systems. International mobile telecommunications in the year 2000 (IMT-2000) is the 3G specification under development by the International Telecommunications Union (ITU) that will provide standardized requirements for enhanced voice and data services over next generation wireless networks. The leading IMT-2000 proposals are based on code division multiple access (CDMA) techniques. 3G wireless cellular networks (IMT-2000 networks) include cdma2000 and wideband CDMA (WCDMA). IMT-2000 networks are often referred to as universal mobile telecommunications systems (UMTSs). However, UMTS is also frequently used when referring specifically to WCDMA.

The generalized architectural framework of a 3G wireless cellular network is based on the geographic placement of a plurality of base station transceivers, each transceiver creating a geographic coverage area known as a cell. A transceiver communicates with remote units within its cell. Such communications are maintained by the wireless cellular network as the remote units move geographically from cell to cell. In addition to multiple transceivers, the base station includes a controller, at least one control channel circuit, one or more fundamental channel circuits, one or more supplemental channel circuits, and a summer. The 3G wireless cellular network also includes at least one centralized base station controller (CBSC), at least one mobile switching center (MSC), and may include additional base stations and hardware components such as gateways and servers.

More specifically, the fundamental channels within the base station of a 3G wireless cellular network are similar to existing CDMA channels and are used primarily for voice transmissions, except spread over a wider bandwidth. In contrast, supplemental channels are utilized for communicating data transmissions to the remote unit, with the data rate of the supplemental channels being negotiated prior to transmission. Multiple data sources are time multiplexed on the supplemental channels. As such, the supplemental channels are referred to as shared channels, while fundamental channels are referred to as dedicated channels. In addition, the QoS (e.g., frame error rate (FER), bit error rate (BER), and/or transmission delay) of a supplemental channel may be set and operated independently of the fundamental channel. Both fundamental and supplemental channels are viewed as radio resources. Radio resource management, inter alia, encompasses scheduling and allocating voice and data communication signals over fundamental and supplemental channels.

Within a 3G wireless cellular network, all remote unit and base station transmissions commonly occur simultaneously within the same frequency band. This results in a received signal at a base station or remote unit that comprises a multiplicity of frequency and time-overlapping coded signals from individual remote units or base stations, respectively. Each of these coded signals is transmitted simultaneously at the same radio frequency (RF) and is distinguishable only by its specific encoding (channel). In other words, the signal received at a base station or remote unit receiver is a composite signal of each transmitted signal, and an individual signal is distinguishable only after decoding.

When a remote unit within the 3G wireless cellular network is not actively communicating to a base station, it is continuously or periodically monitoring a forward channel for notification of any pending transmission by the base station. When the base station determines that a data transmission to the remote unit needs to take place, it must determine if supplemental channel circuitry is available for handling the transmission. Shortly prior to or during supplemental channel availability, the base station notifies the remote unit of a pending data transmission via a control or fundamental channel. Control information, such as power level and other parameters necessary for communication over the supplemental channel, is forwarded to the remote unit. Finally, data transmission to the remote unit takes place utilizing the supplemental channel.

Because the number of supplemental channels available within a communications system are limited, the ability to quickly access a supplemental channel may be limited due to several remote units contending for the available supplemental channels. Under these circumstances, a supplemental channel may not be available for transmission to a given remote unit. Because of this, the remote unit will be placed in a queue until supplemental channel circuitry is available for transmission. While in the queue, the base station communicates with the remote unit on either a control channel or fundamental channel. This is dependent on the state of the remote unit. The base station will make assignments to the remote unit to minimize the transitional delay when a supplemental channel becomes available. Assignment information may include spreading codes utilized by the fundamental and supplemental channels, the data rate for the supplemental channel, and the time duration a remote unit has access to the supplemental channel. However, data transmission via the supplemental channel is prevented until a channel becomes available after an existing data transmission is either completed or dropped.

Broad-band communications systems must be able to provide an array of services to support high-speed data transmissions. One such service is a simplified method for scheduling and allocating data transmissions over communication channels for data service users in a manner that provides data service to as many users requesting service as possible, while also maintaining guaranteed QoS levels for each data transmission.

Accordingly, there is a need to improve the efficiency of broad-band communications systems when the number of users requesting data service in such a system exceeds the number of channels available for such transmissions.

DETAILED DESCRIPTION OF THE DRAWINGS

In describing the present invention, the term "frame count" refers to the number of transmitted data frames per user with adjustments for accommodating new users. The adjustments are described in detail below.

Figure 1:
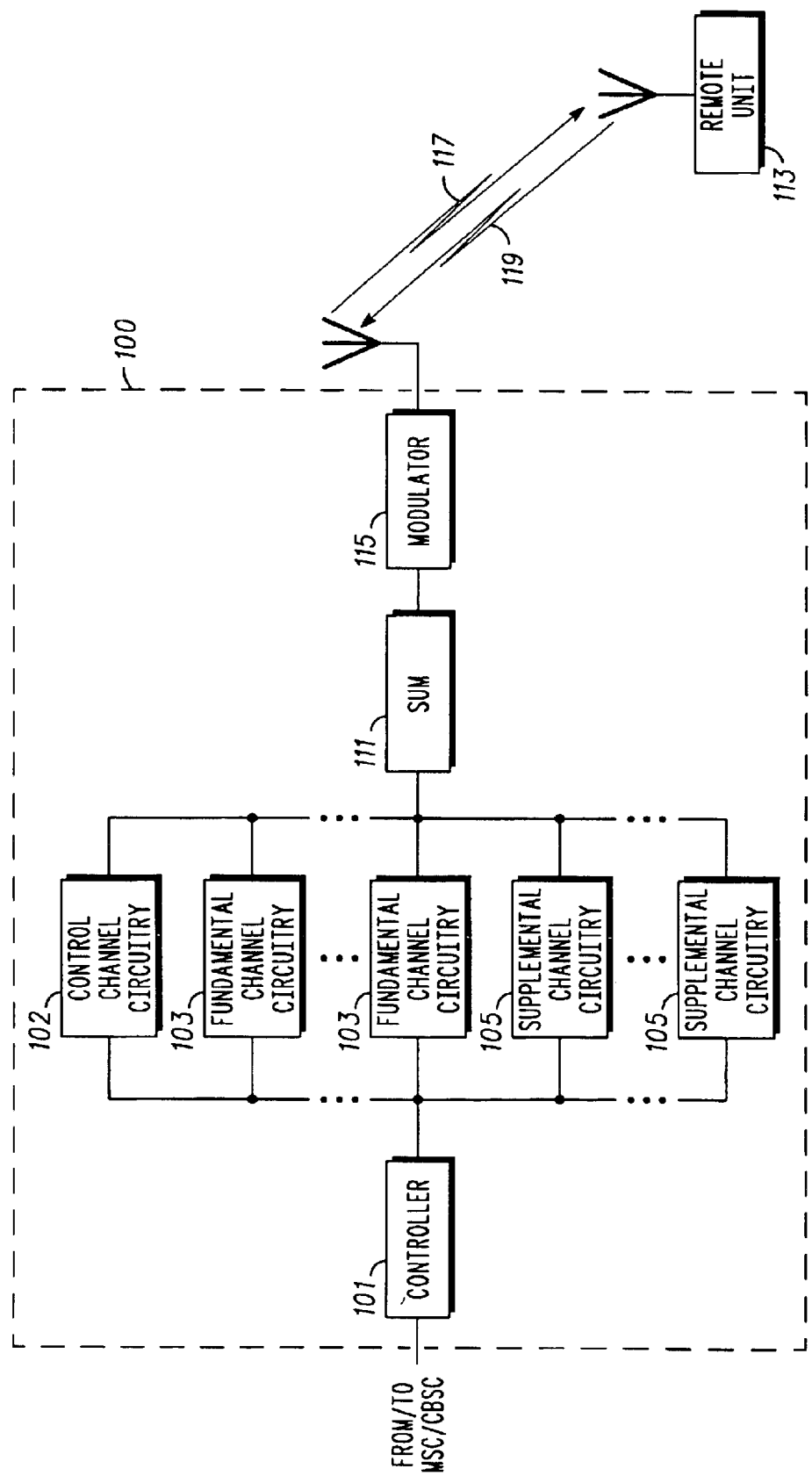
FIG. 1 is a block diagram of a base station within a 3G wireless cellular network that schedules and allocates data transmissions in accordance with the several embodiments of the present invention.

Turning now to the drawings, wherein like numerals designate like components, FIG. 1 is a block diagram of a base station 100 within a 3G wireless cellular network that schedules and allocates data transmissions in accordance with the several embodiments of the present invention. The base station 100 utilizes a cdma2000 wireless cellular communications network architecture as described in the cdma2000 International Telecommunications Union-Radio Communications Division (ITU-R) Radio Transmission Technology (RTT) Candidate Submission document, which is incorporated herein by reference. However, it is contemplated that, the present invention may utilize other 3G wireless cellular communications network architectures, such as WCDMA or UMTS (IMT-2000), and other types of broad-band communications system architectures using shared transmission mediums, such as physical landlines or wireless air, atmosphere, or space links. As shown in FIG. 1, the base station 100 comprises a controller 101, at least one control channel circuit 102, one or more fundamental channel circuits 103, one or more supplemental channel circuits 105, summer 111, and modulator 115. The actual number of fundamental channel circuits that exist at the base station defines how many fundamental channels are available for assignment by the base station. Likewise, the actual number of supplemental channel circuits that exist at the base station define how many supplemental channels are available for assignment by the base station. The base station 100 communicates with a remote unit 113 via a forward link communication signal 117, and the remote unit 113 communicates with the base station 100 via a reverse link communication signal 119. The remote unit 113 can be a cellular or personal communications system (PCS) radiotelephone, a personal digital assistant (PDA), a pager, a palm-top computer, a personal computer, or other wireless device for wireless communications. Accordingly, as used herein, remote unit 113 refers to each of these devices and their equivalents.

Communications to and from the remote unit 113 take place utilizing supplemental channel circuitry 105 and/or fundamental channel circuitry 103 and/or control channel circuitry 102. The invention will be described with data being transmitted from the base station 100 to the remote unit 113, however, data transmission from the remote unit 113 to the base station 100 occurs in a similar manner without departing from the spirit and scope of the invention.

During periods when the remote unit 113 is not actively communicating with the base station 100 via either a fundamental or a supplemental channel, the remote unit 113 is in a suspended state, actively or periodically monitoring a forward control channel for notification of any pending transmission by the base station 100. In particular, control channel circuitry 102 is utilized to send messages to the remote unit 113 when forward link transmissions are pending. Suitable control channel circuitry 102 is described in IS-95A sections 7.1.3.4, 7.6.2, and 7.7.2 and the RTT Candidate Submission Document (cdma2000). Initially, the base station 100 receives a data service request from either a remote unit 113 within its coverage area, or from its corresponding centralized base station controller (CBSC) or mobile switching center (MSC) for a data transmission to be communicated to a remote unit 113 within its coverage area. When the base station 100 determines that a data transmission to a remote unit 113 in its coverage area needs to take place, it notifies the remote unit 113 of the pending data transmission via control channel circuitry 102 and assigns the remote unit 113 to a fundamental channel to establish an appropriate transmit power level. In particular, the base station 100 notifies the remote unit 113 of spreading codes (Walsh codes) utilized by the fundamental and supplemental channels, and of an assigned data rate of the supplemental channel.

Initial power control takes place utilizing the assigned fundamental channel, as described in IS-95A sections 6.1.2 and 6.6.3.1.1.1 and the RTT Candidate Submission Document (cdma2000). In particular, initial forward link gain must be set high enough to guarantee an acceptable link. Since the channel quality between the base station 100 and the remote unit 113 is unknown at the time of origination, the call is originated at a minimum forward link gain and then powered up accordingly. Once at the appropriate power level, the base station 100 grants data service access to the user and must then determine if supplemental channel circuitry 105 is available for handling the subsequent data transmission. Assuming supplemental channel circuitry 105 is available, users granted data service are assigned to supplemental channel circuitry 105 on a first-in-highest-priority (FIHP) basis. Accordingly, each user granted data service access for data transmission to a remote unit 113 in the coverage area of the base station 100 is assigned to an available supplemental channel to handle the data transmission. In particular, the assigned supplemental channel circuitry 105 outputs data to be transmitted to the summer 111, where it is summed with other channel transmissions. The resulting summed transmissions are then modulated by the modulator 115 and transmitted to the remote unit 113 via the forward link communication signal 117. At the completion of the data transmission, the supplemental and fundamental channels are dropped and become available for the assignment of subsequent data transmissions.

However, due to the limited number of supplemental channels available within a base station 100, a supplemental channel may not be immediately available for data transmission to a remote unit 113. Under such circumstances, the controller 101 assigns supplemental channels on a time-sharing basis to users that have been granted data service.

Figure 2:
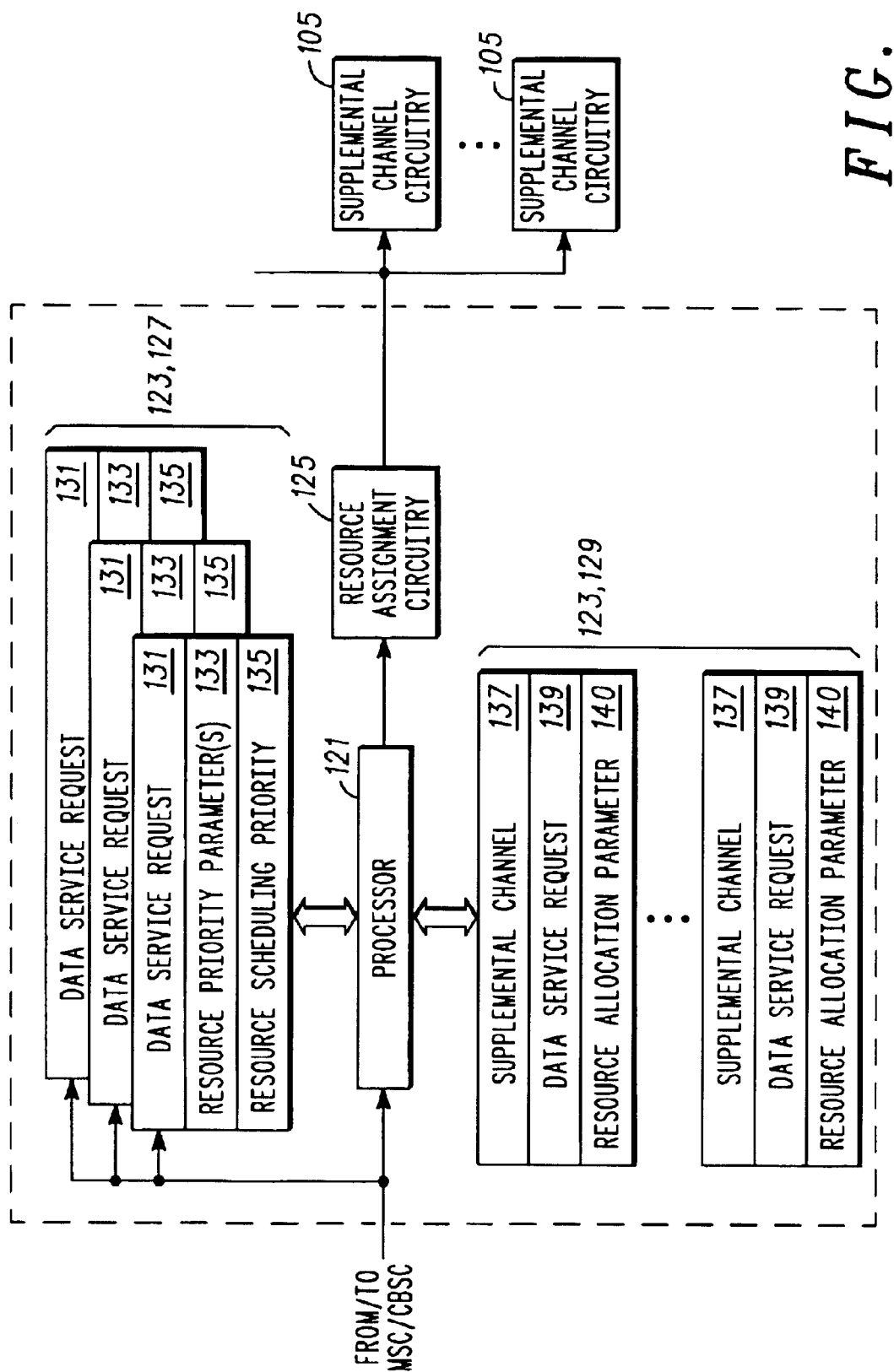
FIG. 2 is a block diagram of the controller of FIG. 1 that performs radio resource management for data transmissions within the base station of FIG. 1 in accordance with the several embodiments of the present invention.

Referring to FIG. 2, the controller 101 (FIG. 1) comprises a processor 121, data storage 123, and resource assignment circuitry 125. Data storage 123 in the controller 101 further provides storage of certain data service request information 127 and radio resource information 129. More specifically, data service request information 127 is stored for each data user requesting access to supplemental channel circuitry 105 for the transmission of data to a remote unit 113 in the base station's 100 coverage area. For each data service request, the data service request information 127 comprises identification of the data service request 131, resource priority parameters 133 used in a radio resource scheduling and allocation algorithm, and the value resulting from the resource scheduling function 135 implemented in a radio resource scheduling and allocation algorithm.

More specifically, the controller 101 executes a radio resource scheduling and allocation algorithm 300 (described in detail below with reference to FIGS. 3a, 3b, 4a, and 4b), the resource priority parameter 133 maintained in data storage 123 is the frame count for the data transmission. Alternatively, when the controller 101 executes a radio resource scheduling and allocation algorithm 500 (described in detail below with reference to FIGS. 5a, 5b, 6a, and 6b), multiple resource priority parameters 133 are maintained in data storage 123 along with coefficients for each parameter. Under this alternate embodiment, the resource priority parameters 133 may include frame count, transmission time, number of data frames queued, signal/noise ratio, FER, BER, transmission delay, jitter, or other communication parameters for the data transmission. In both cases, the radio resource scheduling and allocation algorithms 300, 500 contain a resource scheduling function that determines a resource scheduling priority 135 for each user based on the resource priority parameters 133 implemented. The resource scheduling priority 135 resulting from the resource scheduling function is also maintained in data storage 123.

For each supplemental channel at the base station 100, radio resource information 129 comprises identification of each supplemental channel 137, identification of a data service request 139 assigned to transmit data over the supplemental channel, and a resource allocation parameter 140. Assignment of a data service request 139 to a supplemental channel 137 is based on its priority over contending data service requests according to a radio resource scheduling and allocation algorithm. More specifically, when the controller 101 executes the radio resource scheduling and allocation algorithm 300, the resource allocation parameter 140 is a pre-determined number of frame counts which each assigned data service request will transmit before reassessment of the priority of data service requests by the algorithm 300. Alternatively, when the controller 101 executes the radio resource scheduling and allocation algorithm 500, the resource allocation parameter 140 is a pre-determined transmission time for each assigned data transmission.

Transmission of data on a given supplemental channel may stop, thereby making the supplemental channel available for further assignment of data service requests, inter alia, for three reasons. Firstly, transmission on a supplemental channel will stop when all data has been communicated to the remote unit 113. In this situation, the remote unit 113 will perform an acknowledgment of the last data frame transmitted. In particular, error control takes place either by acknowledging (ACK) data frames that have been received and/or by providing a negative acknowledgment (NAK) for messages whose sequence number has not been received even though later numbered messages have been received. (Note that if NAK procedures are used, the successful reception of the last data frame must be acknowledged even if the protocol uses NAK-only procedures during the rest of the data transmission).

Secondly, transmission stops on a supplemental channel because the particular data user's access to the channel has reached its allocation, either in data frames or transmission time. A third reason is simply that the data transmission has been interrupted. In either of these last two situations, data remains to be transmitted to the remote unit 113, and the data service request remains in contention for further assignment and allocation to supplemental channel circuitry 105 until all data has been transmitted.

Figure 3A:
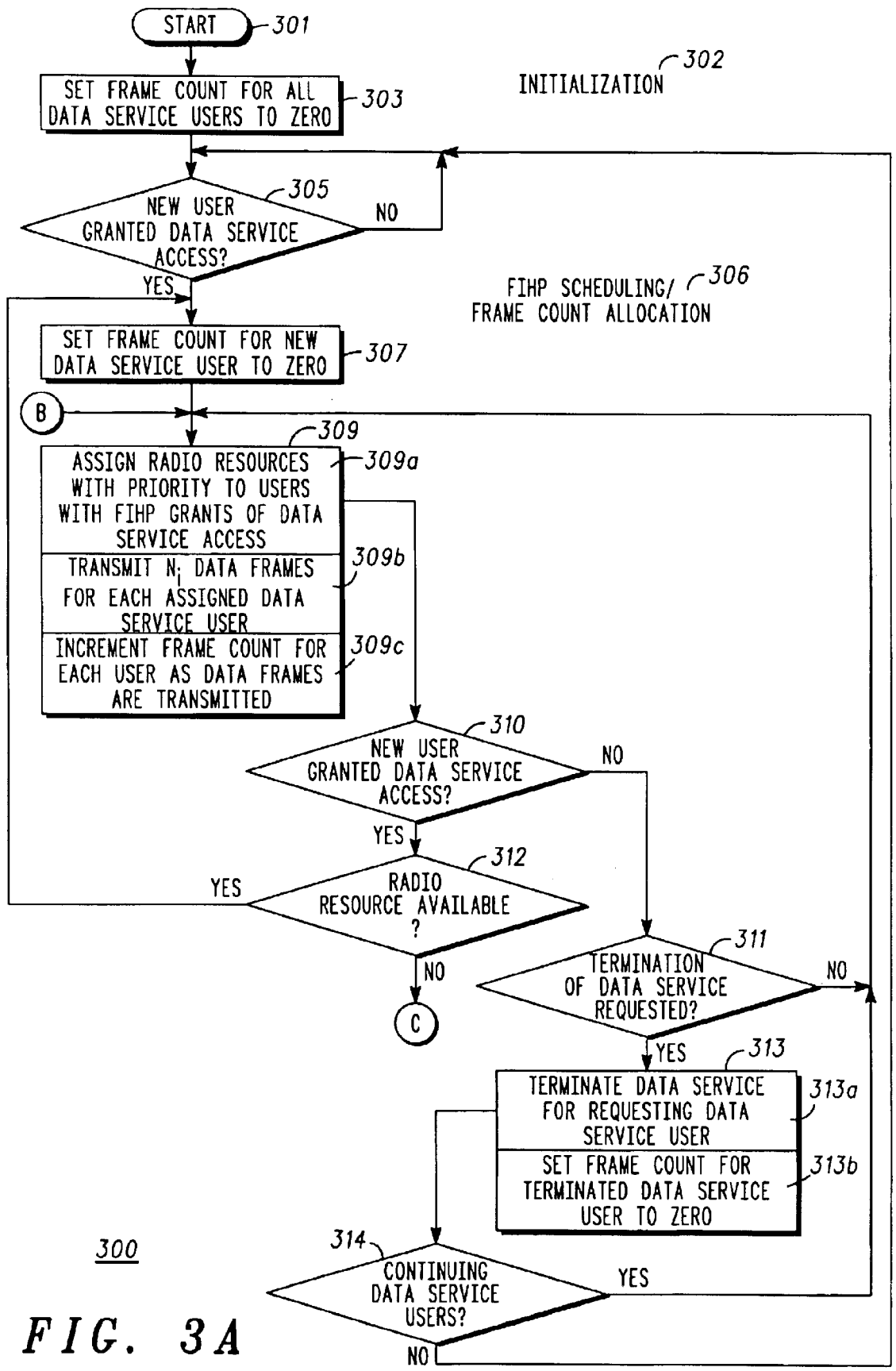
FIGS. 3a and 3b are a flow chart illustrating a method for scheduling and allocating data transmission over radio resources within the base station of FIG. 1 in accordance with a first embodiment of the present invention.
Figure 3B:
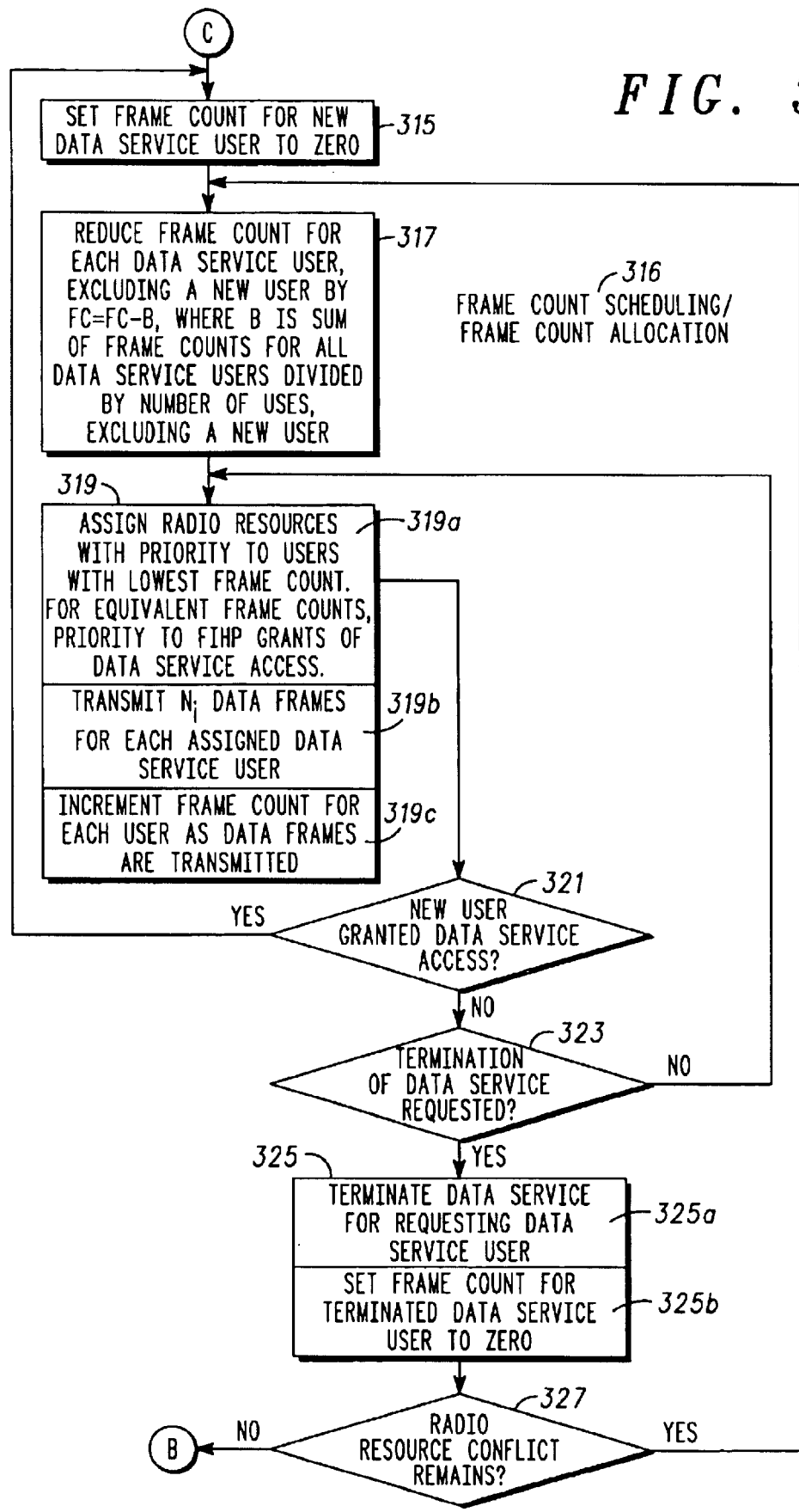

Referring now to FIGS. 3a and 3b, a flow chart illustrating a method of scheduling and allocating data transmissions over radio resources within the base station 100 is shown. In the embodiment being described, the radio resource scheduling and allocation algorithm 300 is implemented in the controller 101 and treats each user that has been granted data service access substantially equal by performing time-sharing of the supplemental channels at the base station 100 proportionately. However, it is contemplated that the algorithm 300 may be implemented at the CBSC.

The radio resource scheduling and allocation algorithm 300 consists of an initialization 302, a FIHP scheduling and frame count allocation loop 306, and a frame count scheduling and frame count allocation loop 316. The algorithm 300 is executed in the processor 121 of the controller 101 and begins at step 301. From step 301, the processor proceeds to initialization 302 then to step 303 where frame counts for all data service users are set to zero before the processor proceeds to step 305. Step 305 creates a nested loop where the processor waits for a new user to request and be granted data service access. When a new user is granted data service access, the processor proceeds to step 307.

Step 307 is the first step in the FIHP scheduling loop 306 where data service requests from new users are assigned to radio resources based on the first requests granted data service access. A pre-determined amount of data frames are allocated to each data transmission assigned to a radio resource during each pass through the FIHP scheduling loop 306. The processor remains in the FIHP scheduling loop 306 until the number of data users exceeds the number of radio resources at the base station.

More specifically, at step 307, in the FIHP scheduling loop 306, the processor sets the frame count for the new data service user to zero and proceeds to a nested loop that begins at step 309. In the nested loop, the processor continuously cycles through scheduling radio resources based on the first data services requests to be granted data service access and allocating data transmissions for assigned data service users until either a new user is granted data service access or a user with data service access requests termination of data service.

More specifically, at step 309, the processor assigns radio resources to all users granted data service access (309a), allocates transmission of a pre-determined number of data frames ($N_i$) over each radio resource assigned (309b), and increments the frame count for each user as data frames are transmitted (309c). The processor continues from step 309 to step 310 and determines if a new user has requested and been granted data service access. If no new user has been granted data service access, the processor continues in the nested loop to step 311, otherwise it proceeds to step 312. At step 311, the processor determines if any user has transmitted all of its data and requested termination of data service. If no user has requested termination of data service, the processor continues in the nested loop and returns to step 309, otherwise it proceeds to step 313.

The processor reaches step 312 if a new user has requested and been granted data service access while the processor is in the FIHP scheduling loop 306. At step 312, the processor checks to see if a radio resource is available by comparing the number of users granted data service access to the number of radio resources at the base station. If a radio resource is available, the processor returns to step 307, otherwise it proceeds to step 315 where the frame count scheduling and frame count allocation loop 316 begins.

The processor reaches step 313 if an existing data service user has requested termination of data service. At step 313, the processor terminates data service for the user that has requested termination (313a) and sets the frame count for the terminated user to zero (313b). After step 313, the processor proceeds to step 314 and determines if there are any continuing data users after termination of data service to the requesting data service user. If there are any continuing data service users, the processors re-enters the nested loop and returns to step 309, otherwise there are no current data service users and the processor returns to step 305 in the initialization 302.

The processor reaches step 315 if the number of users granted data service access exceeds the number of radio resources at the base station. Step 315 is the first step in the frame count scheduling and frame count allocation loop 316.

A frame count for each data service user is maintained, radio resources are assigned to users with the lowest frame count, and a pre-determined number of data frames are allocated to each data transmission assigned to a radio resource during each pass through the frame count scheduling loop 316. The processor remains in the frame count scheduling loop 316 until the number of data users is less than or equal to the number of radio resources at the base station.

More specifically, at step 315, the processor sets the frame count for the new data service user to zero and proceeds to step 317. At step 317, the processor reduces the frame count for each data service user, except a new user, according to the following equation:

$$FC=FC-B. \qquad (1),$$

where FC is the frame count for the data service user; and B is the sum of the frame counts for all data service users granted data service access divided by the number of data service users, excluding a new user.

After step 317, the processor proceeds to a nested loop that begins at step 319. In the nested loop, the processor continuously cycles through scheduling radio resources based on the lowest frame count and allocating data transmissions for assigned data service users until either a new user is granted data service access or a user with data service access requests termination of data service.

More specifically, at step 319, the processor assigns radio resources to users with the lowest frame counts (319a), allocates transmission of a pre-determined number of data frames ($N_i$) over each radio resource assigned (319b), and increments the frame count for each data service user as data frames are transmitted (319c). If contending users have equal frame counts, the processor assigns radio resources to the contending users based on the first to be granted data service access (319a). The processor continues from step 319 to step 321 and determines if a new user has requested and been granted data service access. If no new user has been granted data service access, the processor continues in the nested loop to step 323, otherwise it returns to step 315. At step 323, the processor determines if any user has transmitted all of its data and requested termination of data service. If no user has requested termination of data service, the processor continues in the nested loop and returns to step 319, otherwise it proceeds to step 325.

The processor reaches step 325 if an existing data service user has requested termination of data service. At step 325, the processor terminates data service for the data service user that has requested termination (325a) and sets the frame count for the terminated user to zero (325b). After step 325, the processor proceeds to step 327 and determines if a radio resource conflict remains after data service has been terminated to an existing user by comparing the remaining number of users granted data service access to the number of radio resources at the base station. If there are more users than radio resources, a conflict remains and the processor returns to step 317, otherwise no radio resource conflict exists and the processor returns to step 309 in the FIHP scheduling loop 306.

Figure 4A:
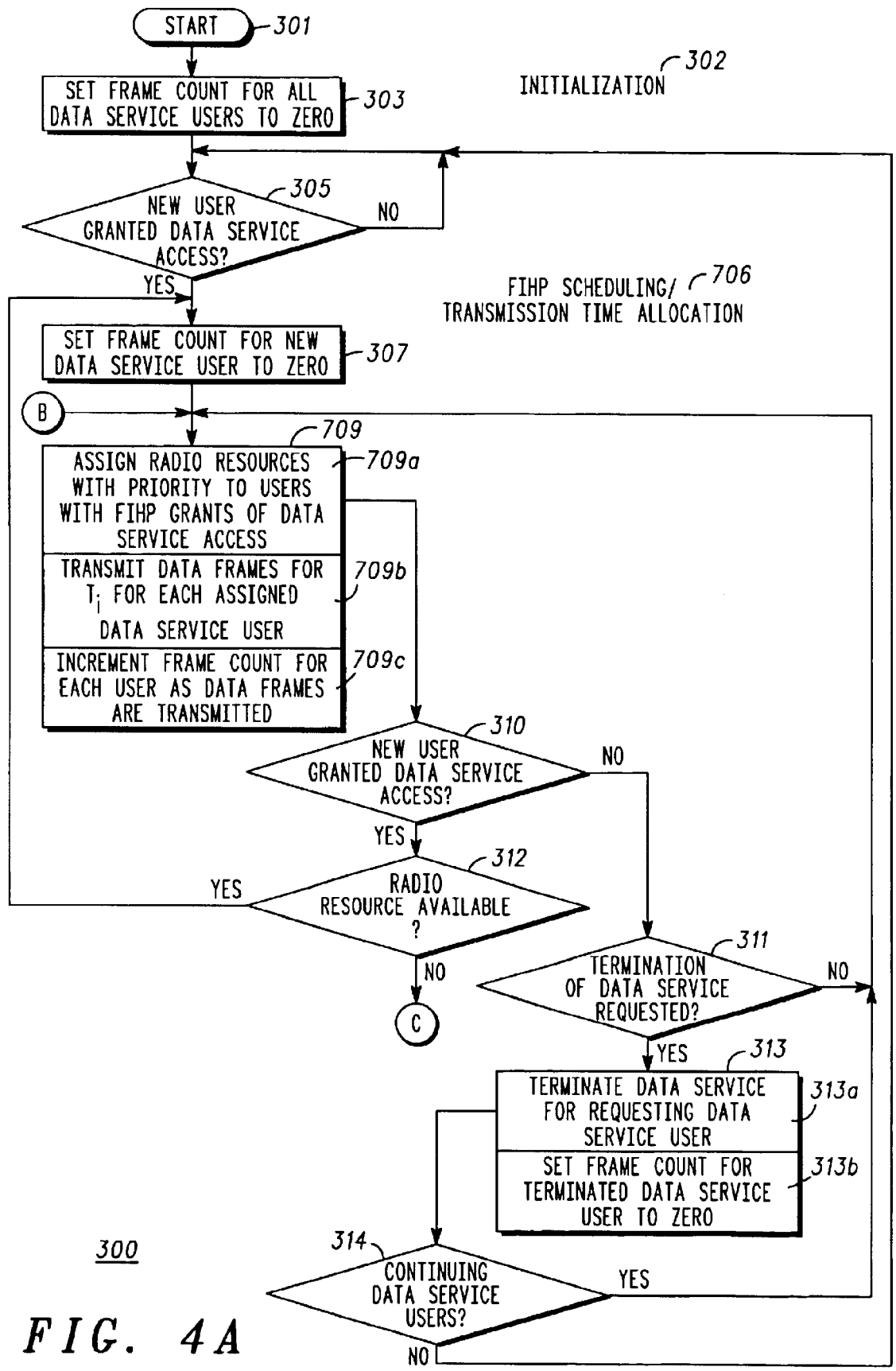
FIGS. 4a and 4b are a flow chart illustrating a method of scheduling and allocating data transmissions over radio resources within the base station of FIG. 1 in accordance with an second embodiment of the present invention.
Figure 4B:
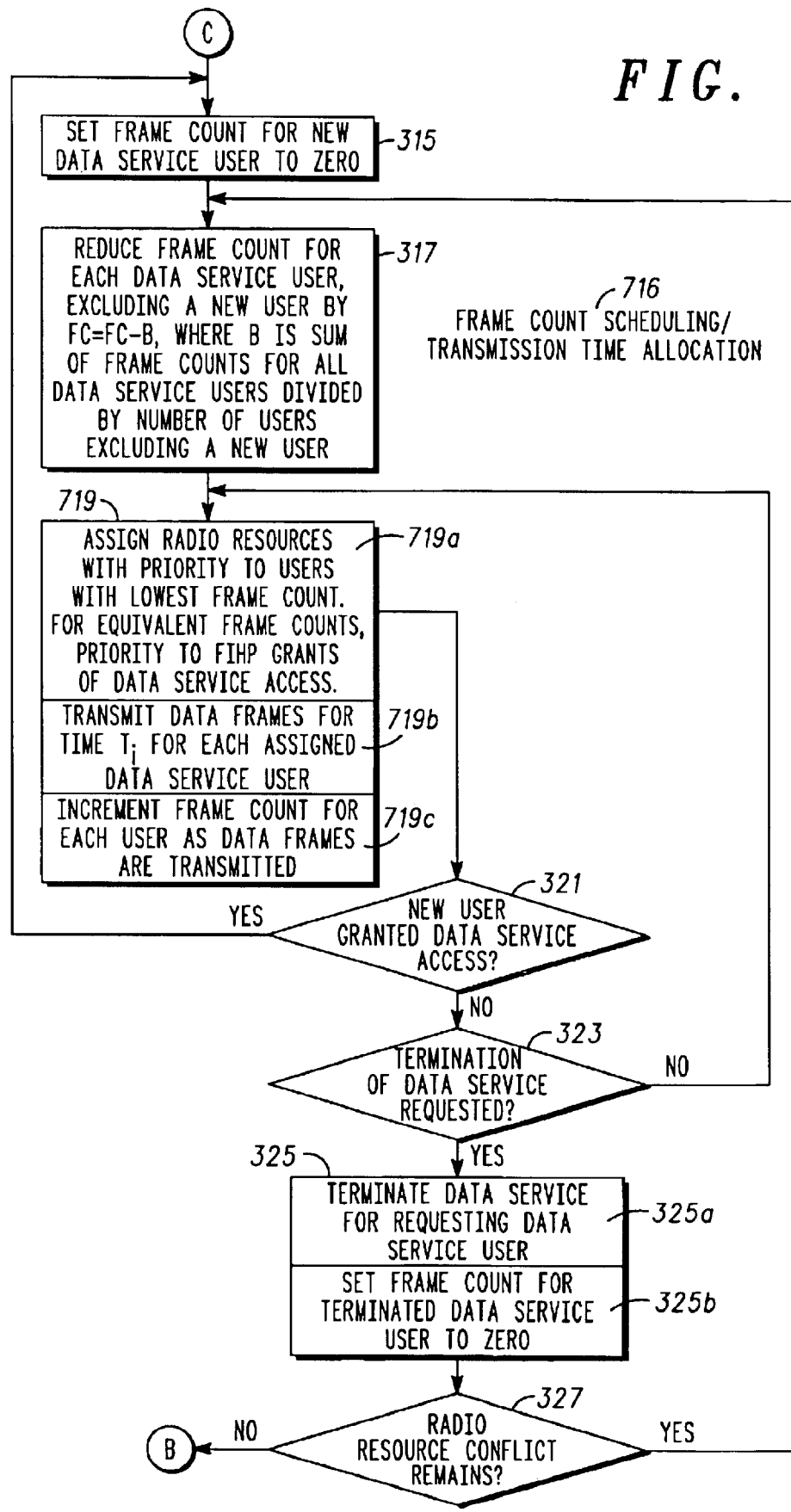

Referring now to FIGS. 4a and 4b, where like reference numbers denote like method steps, the radio resource scheduling and allocation algorithm 300 can be modified to allocate a pre-determined length of time for data transmissions over the assigned radio resource instead of allocating a pre-determined number of data frames to a user.

As shown, this alternate allocation subroutine is performed by step 709 in the FIHP scheduling and transmission time allocation loop 706. If the number of users granted data service access is less than or equal to the number of radio resources at the base station, the processor proceeds to step 709 from either steps 307, 311, 314, or 327. At step 709, the processor assigns radio resources to all users granted data service access (709*a*), allocates transmission of data frames over each radio resource assigned for a pre-determined length of time (709*b*), and increments the frame count for each user as data frames are transmitted (709*c*). After step 709, the processor proceeds to step 310 and continues to execute the FIHP scheduling loop 706.

Similarly, this alternate allocation subroutine is performed by step 719 in the frame count scheduling and transmission time allocation loop 716. If the number of users granted data service access is greater than the number of radio resources at the base station, the processor enters the frame count scheduling loop 716. After adjusting the frame counts for data service users in steps 315 and 317, the processor proceeds to step 719. At step 719, the processor assigns radio resources to users with the lowest frame counts (719*a*), allocates transmission of data frames over each radio resource assigned for a pre-determined length of time (719*b*), and increments the frame count for each user as data frames are transmitted (719*c*). If contending users have equal frame counts, the processor assigns radio resources to the contending users based on the first to be granted data service access (719*a*). After step 719, the processor proceeds to step 321 and continues to execute the frame count scheduling loop 716.

Figure 5A:
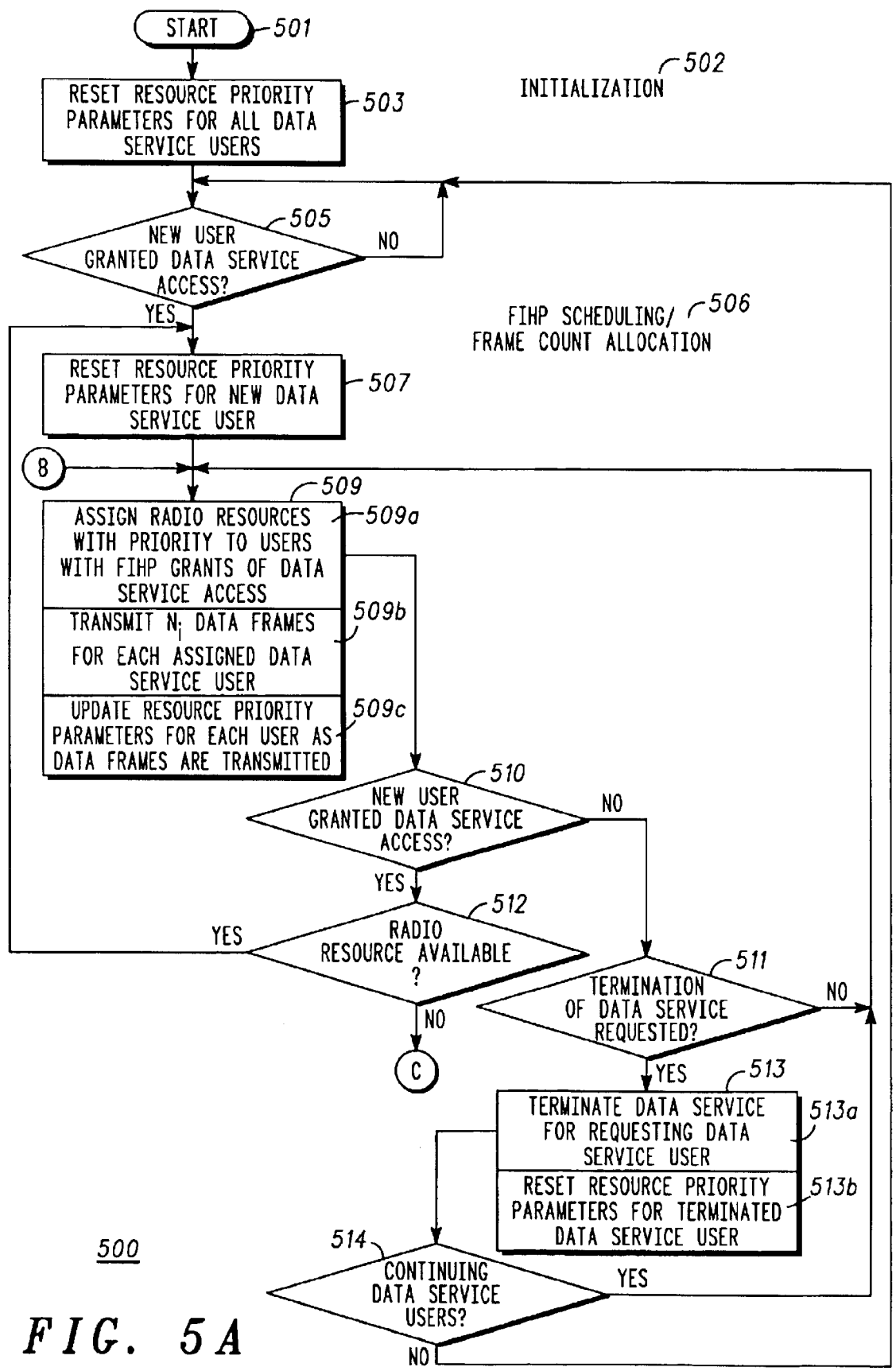
FIGS. 5a and 5b are a flow chart illustrating a method of scheduling and allocating data transmissions over radio resources within the base station of FIG. 1 in accordance with an third embodiment of the present invention.
Figure 5B:
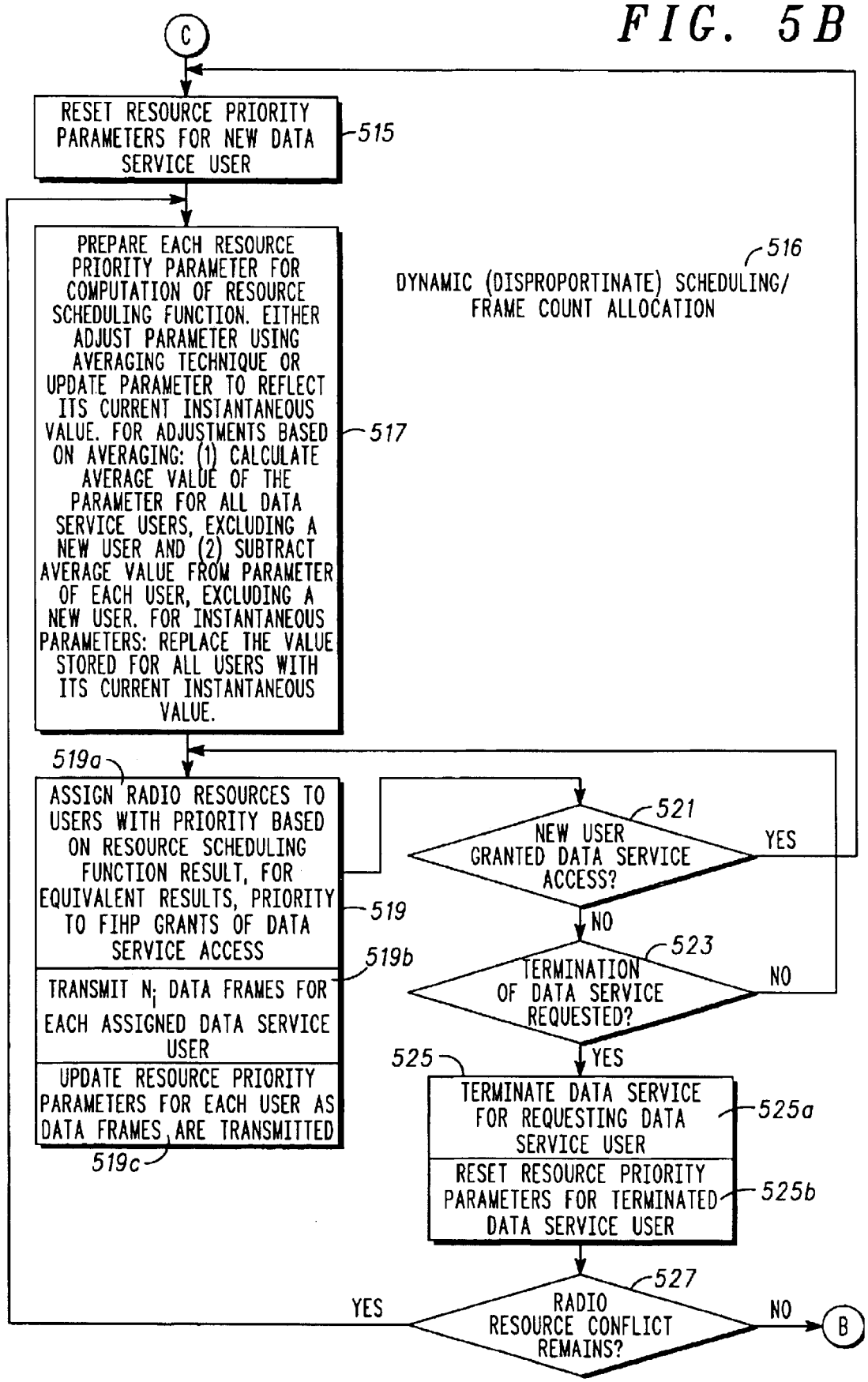

Referring now to FIGS. 5*a* and 5*b*, a flow chart illustrating another method of scheduling and allocating data transmissions over radio resources within the base station 100 is shown. In particular, an alternate radio resource scheduling and allocation algorithm 500 consists of an initialization routine 502, a FIHP scheduling and frame count allocation loop 506, and a dynamic (disproportionate) scheduling and frame count allocation loop 516. The algorithm 500 can be executed in the processor 121 of the controller 101 or in the CBSC. The algorithm 500 incorporates multiple communication parameters that contribute in a manner that makes sharing of the supplemental channels more or less sensitive to that particular parameter. Under this embodiment, sharing of the supplemental channels is substantially disproportionate and dynamically dependent on the communication parameters and the sensitivity to each parameter implemented. The algorithm 500 begins at step 501 and proceeds to the initialization routine 502 at step 503 where resource priority parameters for all data service users are reset to zero. Thereafter, the processor proceeds to step 505 where the processor waits in a nested loop for a new user to request and be granted data service access. When a new user is granted data service access, the processor proceeds to step 507.

Step 507 is the first step in the FIHP scheduling loop 506 where data service requests from new users are assigned to radio resources based on the first requests granted data service access. A predetermined amount of data frames are allocated to each data transmission assigned to a radio resource during each pass through the FIHP scheduling loop 506. The processor remains in the FIHP scheduling loop 506 until the number of data users exceeds the number of radio resources at the base station.

More specifically, at step 507, in the FIHP scheduling loop 506, the processor resets the resource priority parameters for the new data service user and proceeds to a nested loop that begins at step 509. In the nested loop, the processor continuously cycles through scheduling radio resources based on the first data services requests to be granted data service access and allocating data transmissions for assigned data service users until either a new user is granted data service access or a user with data service access requests termination of data service.

More specifically, at step 509, the processor assigns radio resources to all users granted data service access (509*a*), allocates transmission of a pre-determined number of data frames ($N_i$) over each radio resource assigned (509*b*), and updates the resource priority parameters for each data service user as data frames are transmitted (509*c*). The processor continues from step 509 to step 510 and determines if a new user has requested and been granted data service access. If no new user has been granted data service access, the processor continues in the nested loop to step 511, otherwise it proceeds to step 512. At step 511, the processor determines if any user has transmitted all of its data and requested termination of data service. If no user has requested termination of data service, the processor continues in the nested loop and returns to step 509, otherwise it proceeds to step 513.

The processor reaches step 512 if a new user has requested and been granted data service access while the processor is in the FIHP scheduling loop 506. At step 512, the processor checks to see if a radio resource is available by comparing the number of users granted data service access to the number of radio resources at the base station. If a radio resource is available, the processor returns to step 507, otherwise it proceeds to step 515 where the dynamic (disproportionate) scheduling and frame count allocation loop 516 begins.

The processor reaches step 513 if an existing data service user has requested termination of data service. At step 513, the processor terminates data service for the user that has requested termination (513*a*) and resets the resource priority parameters for the terminated user (513*b*). After step 513, the processor proceeds to step 514 and determines if there are any continuing data service users after termination of data service to the requesting data service user. If there are any continuing data service users, the processor re-enters the nested loop and returns to step 509, otherwise there are no current data service users and the processor returns to step 505 in the initialization 502.

The processor reaches step 515 if the number of users granted data service access exceeds the number of radio resources at the base station. Step 515 is the beginning of the dynamic (disproportionate) scheduling and frame count allocation loop 516. Resource priority parameters (e.g., frame count, transmission time, number of data frames queued, signal/noise ratio, FER, BER, transmission delay, jitter, etc.) are maintained for each data service user. Such parameters are used in a resource scheduling function to compare data service requests from each user. Radio resources are assigned to users based on the resource scheduling function and a pre-determined amount of data frames are allocated to each data transmission assigned to a radio resource during each pass through the dynamic (disproportionate) scheduling loop 516. Note that the dynamic (disproportionate) scheduling loop 516 can give priority to data service users with either the lowest value or, alternatively, the highest value resulting from the resource scheduling function, depending on the implementation preferred. The processor remains in the dynamic (disproportionate) scheduling loop 516 until the number of data users is less than or equal to the number of radio resources at the base station.

More specifically, at step 515, the processor resets the resource priority parameters (e.g., $X_1, X_2, X_3, X_4$, etc.) for the new data service user and proceeds to step 517. At step

517, the resource priority parameters are prepared for insertion in the subsequent resource scheduling function. Depending on the characteristics of the parameter, preparation consists of either adjusting the parameter based on an averaging technique or updating the parameters to reflect its current instantaneous value. Parameters that are accumulative in nature (e.g., frame count, transmission time, etc.) are adjusted using an averaging technique. Parameters that vary according to instantaneous conditions (e.g., number of data frames queued, signal/noise ratio, etc.) of the system, channel, or data transmission are updated to reflect current conditions. When it is appropriate to use the averaging technique at step 517, the processor calculates the average value ($B_n$) of the resource priority parameter ($X_n$) for all data services users, excluding a new data service user. In other words, the first resource priority parameter ($X_1$) for all data service users granted data service access is summed and divided by the number of data service users, excluding a new user, to determine an average value ($B_1$). When appropriate, the average value ($B_n$) of an additional resource priority parameter ($X_n$) is determined in the same fashion. Next, the processor adjusts the value of the resource priority parameter for each data service user by subtracting the average value for the resource priority parameter, according to the following equation:

$$X_n = X_n - B_n. \quad (2),$$

where n is a resource priority parameter; X is the current value of the resource priority parameter for a data service user; and B is the average value of the resource priority parameter for all data service users granted data service access, excluding a new user.

After step 517, the processor proceeds to a nested loop that begins at step 519. In the nested loop, the processor continuously cycles through scheduling radio resources based on the lowest or, alternatively, the highest resource scheduling function result and allocating data transmissions for assigned data service users until either a new user is granted data service access or a user with data service access requests termination of data service.

More specifically, at step 519, the processor performs a resource scheduling function calculation for each data service user by inserting the resource priority parameter values for a specific data service user in the following equation:

$$F(X) = W_1(X_1) + W_2(X_2) + \ldots + W_j(X_j). \quad (3),$$

where F(X) is the result of the resource scheduling function for a given data service user; $X_1$ is a first resource priority parameter for the data service user; $W_1$ is a coefficient of the first resource priority parameter for each data service user and designed to normalize or scale the parameter with respect to other parameters in the overall function; $W_1(X_1)$ is a function that takes on real values in the range $[0, V_1]$ and determines the first component of the overall function; $X_2$ is a second resource priority parameter for the data service user; $W_2$ is a coefficient of the second resource priority parameter for each data service user and designed to normalize or scale the parameter with respect to other parameters in the overall function; $W_2(X_2)$ is a function that takes on real values in the range $[0, V_2]$ and determines the second component of the overall function; $X_j$ is a jth resource priority parameter for the data service user; $W_j$ is a coefficient of the jth resource priority parameter for each data service user and designed to normalize or scale the parameter with respect to other parameters in the overall function; and $W_j(X_j)$ is a function that takes on real values in the range $[0, V_j]$ and determines the jth component of the overall function.

The processor compares the resource scheduling function result for each data service user and assigns radio resources to users with the lowest or, alternatively, the highest result (519a), allocates transmission of a pre-determined number of data frames ($N_i$) over each radio resource assigned (519b), and updates the resource priority parameters for each data service user as data frames are transmitted (519c). If contending users have equal results, the processor assigns radio resources to the contending users based on the first to be granted data service access (519a). The processor continues from step 519 to step 521 and determines if a new user has requested and been granted data service access. If no new user has been granted data service access, the processor continues in the nested loop to step 523, otherwise it returns to step 515. At step 523, the processor determines if any user has transmitted all of its data and requested termination of data service. If no user has requested termination of data service, the processor continues in the nested loop and returns to step 519, otherwise it proceeds to step 525.

The processor reaches step 525 if an existing data service user has requested termination of data service. At step 525, the processor terminates data service for the data service user that has requested termination (525a) and resets the resource priority parameters for the terminated user (525b). After step 525, the processor proceeds to step 527 and determines if a radio resource conflict remains after data service has been terminated to an existing user by comparing the remaining number of users granted data service access to the number of radio resources at the base station. If there are more users than radio resources, a conflict remains and the processor returns to step 517, otherwise no radio resource conflict exists and the processor returns to step 509 in the FIHP scheduling loop 506.

Figure 6A:
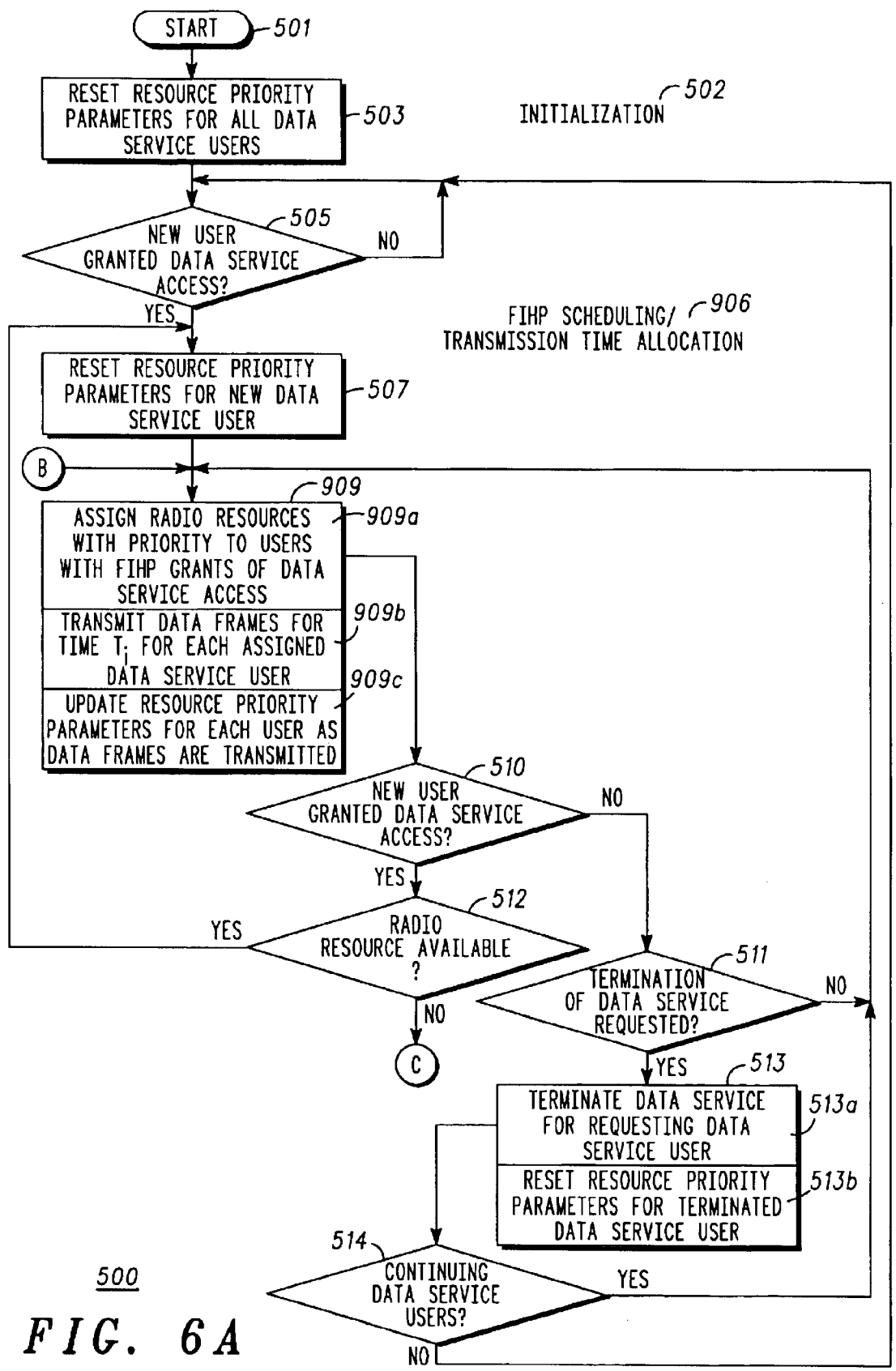
FIGS. 6a and 6b are a flow chart illustrating a method of scheduling and allocating data transmissions over radio resources within the base station of FIG. 1 in accordance with an fourth embodiment of the present invention.
Figure 6B:
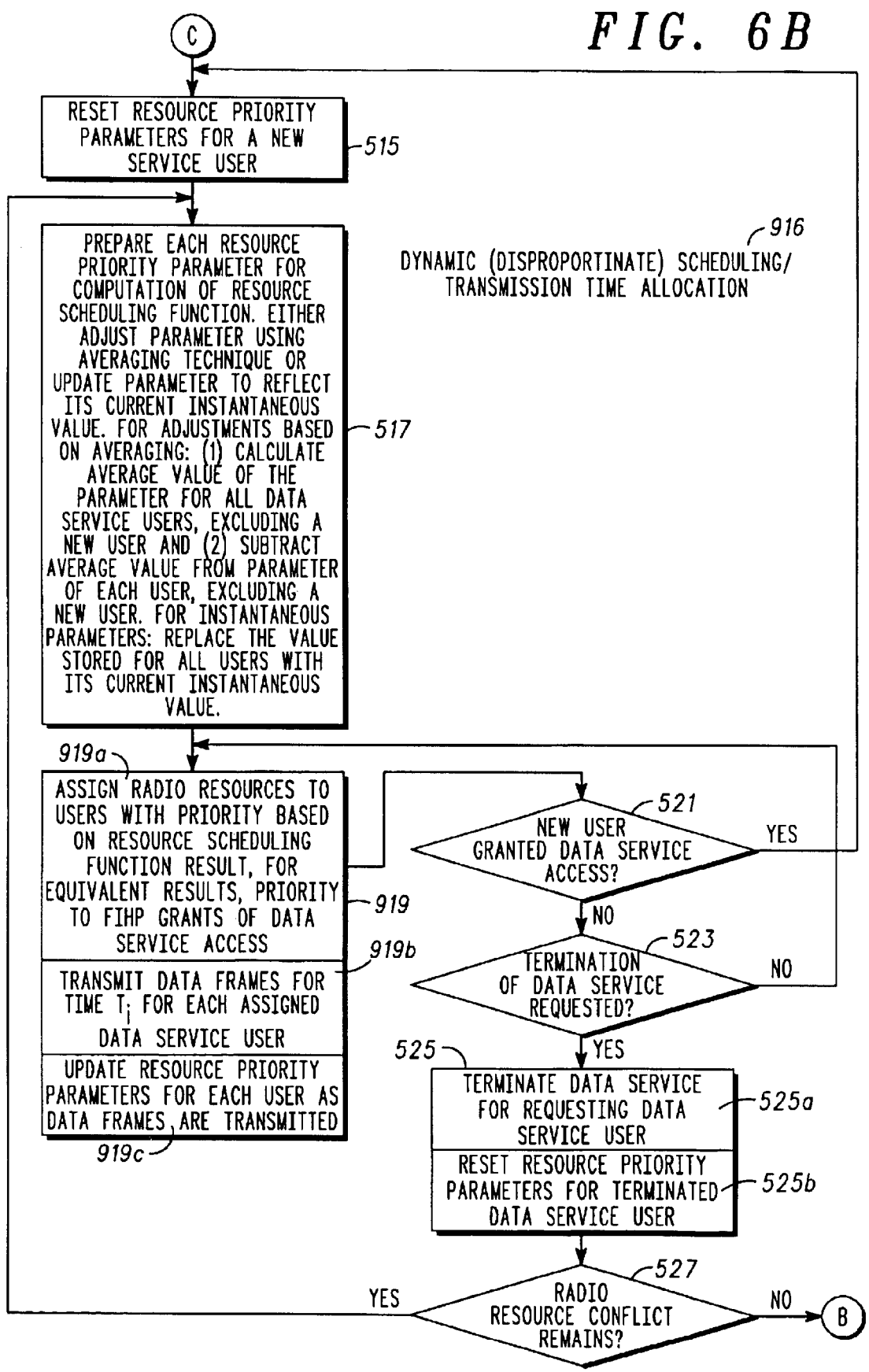

Referring to FIGS. 6a and 6b, where like reference numbers denote like method steps, the radio resource scheduling and allocation algorithm 500 can be modified to allocate a pre-determined length of time for data transmissions over the assigned radio resource instead of allocating a pre-determined number of data frames to a user.

As shown, this alternate allocation subroutine is performed in the FIHP scheduling and transmission time allocation loop 906 by step 909. If the number of users granted data service access is less than or equal to the number of radio resources at the base station, the processor proceeds to step 909 from either steps 507, 511, 514, or 527. At step 909, the processor assigns radio resources to all users granted data service access (909a), allocates transmission of data frames over each radio resource assigned for a pre-determined length of time (909b), and updates the resource priority parameters for each user as data frames are transmitted (909c). After step 909, the processor proceeds to step 510 and continues to execute the FIHP scheduling loop 906.

Similarly, this alternate allocation subroutine is performed in the dynamic (disproportionate) scheduling and transmission time allocation loop 916 by step 919. If the number of users granted data service access is greater than the number of radio resources at the base station, the processor enters the dynamic (disproportionate) scheduling loop 916. After adjusting the resource priority parameters for data service users in steps 515 and 517, the processor proceeds to step 919. At step 919, the processor performs the resource scheduling function calculation for each data service user, compares the results, and assigns radio resources to users with the lowest or, alternatively, the highest result (919a), allocates transmission of data frames over each radio resource assigned for a pre-determined length of time (919b), and updates the resource priority parameters for each user as data frames are transmitted (919c). If contending users have equal results, the processor assigns radio resources to the contending users based on the first to be granted data service access (919a). After step 919, the processor proceeds to step 521 and continues to execute the dynamic (disproportionate) scheduling loop 916.

The several embodiments described above provide an apparatus and method that efficiently schedules and allocates radio resources for data transmissions within a 3G wireless cellular network. The apparatus and method addresses and fulfills the previously mentioned need to improve the efficiency of a broad-band communications system when the number of users requesting data service exceeds the number of channels available for such transmissions. Scheduling and allocating data transmissions over radio resources is accomplished by a controller 101 in a base station 100 or in a CBSC using a radio resource scheduling and allocation algorithms 300 or 500. The algorithms 300, 500 perform timesharing of radio resources (supplemental channel circuits 105) for data transmission among users granted data service access. The radio resource scheduling and allocation algorithms 300, 500 are based on the current state of the system and provide either a proportionate (algorithm 300) or disproportionate (algorithm 500) sharing of such radio resources. The state of the system refers to the number of supplemental channel circuits 105 available and the number of users requesting data service. Proportionate scheduling of the available communication channels treats each user substantially equal and is based on frame counts. While for disproportionate scheduling, assignment may be based on a variety of parameters (e.g., frame count, transmission time, number of data frames queued, signal/noise ratio, FER, BER, transmission delay, jitter, etc.). Each disproportionate scheduling parameter forms a unique component of the overall resource scheduling function, making scheduling more or less sensitive to certain parameters and permitting disproportionate or unequal treatment of users depending on the results of the algorithm 500. In both algorithms 300, 500, once a user is scheduled for data service, the user is allocated a pre-determined number of data frames or a pre-determined time for data transmission over the assigned supplemental channel circuitry 105.

While the invention has been particularly shown and described with reference to a preferred embodiment and several alternate embodiments, it will be understood by those skilled in the art that various changes in form and details may be made therein without departing from the spirit and scope of the invention and it is intended that all such changes come within the spirit and broad scope of the appended claims and their equivalents.

What is claimed is:

1. A method for allocating at least one shared radio resource within a communication system including at least one base station adapted to manage data service access requests, the method comprising:
   a) determining whether a number of existing data service access requests exceeds the number of shared radio resources;
   b) servicing each of the existing data service access requests on a first-in-highest-priority basis when the number of existing data service access requests does not exceed the number of shared radio resources;
   c) assigning a priority value to each of the existing data service access requests when the number of existing data service access requests exceeds the number of shared radio resources;
   d) servicing each of the existing data service access requests based on the respective priority values assigned thereto; and
   e) adjusting the priority value assigned to each of the existing data service access requests when a new data service access request is received by adjusting a frame count value for an existing data service access request according to the equation $FC_{adj}=FC-B$, where $FC_{adj}$ is an adjusted frame count value for the existing data service access request, FC is a present frame count value for the existing data service access request, and B is an average of the frame count values for each of the existing data service access requests.

2. The method of claim 1, further including: f) servicing each of the existing data service access requests based on adjusted priority values determined in e).

3. The method of claim 1, wherein d) includes allocating a predetermined number of data frames to be transmitted for each data service access request that is serviced.

4. The method of claim 1, wherein d) includes allocating a predetermined time period in which to transmit data frames for each data service access request that is serviced.

5. The method of claim 1, wherein d) includes servicing a first plurality of existing data service access requests on a first-in-highest-priority basis when the priority values for the first plurality of existing data service access requests are the same.

6. The method of claim 1, wherein c) includes assigning a frame count value to each of the existing data service access requests when the number of existing data service access requests exceeds the number of shared radio resources.

7. The method of claim 1, wherein d) includes servicing each of the plurality of existing data service access requests based on a frame count value assigned to each of the existing data service access requests.

8. The method of claim 7, wherein d) further includes granting priority to an existing data service access request with a lowest frame count value.

9. The method of claim 1, wherein a) includes determining whether a plurality of existing data service access requests exceeds a number of shared supplemental channels.

10. The method of claim 1, wherein c) includes determining a priority value for an existing data service access request based on at least one resource priority parameter from the group consisting of frame count, transmission time, number of data frames queued, signal-to-noise ratio, FER, BER, transmission delay, and jitter.

11. An apparatus for allocating at least one shared radio resource within a wireless communication system including at least one base station adapted to manage data service access requests, the apparatus comprising:
at least one supplemental channel circuit, each supplemental channel circuit corresponding to one shared radio resource;
a summer for combining forward link data frames received from the plurality of supplemental channel circuits;
a modulator for modulating a summer output signal to be transmitted to at least one wireless subscriber devices and
a controller programmed to:
   a) determine whether a number of existing data service access requests exceeds the number of shared radio resources;
   b) service each of the existing data service access requests on a first-in-highest-priority basis when the number of existing data service access requests does not exceed the number of shared radio resources;
   c) assign a priority value to each of the existing data service access requests when the number of existing data service access requests exceeds the number of shared radio resources;

d) service each of the existing data service access requests based on the respective priority values assigned thereto; and e) adjust the priority value assigned to each of the existing data service access requests when a new data service access request is received by adjusting a frame count value for an existing data service access request according to the equation $FC_{adj}=FC-B$, where $FC_{adj}$ is an adjusted frame count value for the existing data service access request, FC is a present frame count value for the existing data service access request, and B is an average of the frame count values for each of the existing data service access requests.

12. The apparatus of claim 11, wherein the controller is further programmed to f) service each of the existing data service access requests based on adjusted priority values determined in e).

13. The apparatus of claim 11, wherein under d), the controller is further programmed to allocate a predetermined number of data frames to be transmitted for each data service access request that is serviced.

14. The apparatus of claim 11, wherein under d), the controller is further programmed to allocate a predetermined time period in which to transmit data frames for each data service access request that is serviced.

15. The apparatus of claim 11, wherein under d), the controller is further programmed to service a first plurality of existing data service access requests on a first-in-highest-priority basis when the priority values for the first plurality of existing data service access requests are the same.

16. The apparatus of claim 11, wherein under c), the controller is further programmed to assign a frame count value to each of the existing data service access requests when the number of existing data service access requests exceeds the number of shared radio resources.

17. The apparatus of claim 11, wherein under d), the controller is further programmed to service each of the plurality of existing data service access requests based on a frame count value assigned to each of the existing data service access requests.

18. The apparatus of claim 17, wherein under d), the controller is further programmed to grant priority to an existing data service access request with a lowest frame count value.

19. The apparatus of claim 11, wherein under a), the controller is further programmed to determine whether a plurality of existing data service access requests exceeds a number of shared supplemental channels.

20. The apparatus of claim 11, wherein under c), the controller is further programmed to determine a priority value for an existing data service access request based on at least one resource priority parameter from the group consisting of frame count, transmission time, number of data frames queued, signal-to-noise ratio, FER, BER, transmission delay, and jitter.

* * * * *